United States Patent
Fries et al.

(10) Patent No.: US 11,218,323 B2
(45) Date of Patent: Jan. 4, 2022

(54) METHOD AND SYSTEM FOR PRODUCING A SECURE COMMUNICATION CHANNEL FOR TERMINALS

(71) Applicant: SIEMENS AKTIENGESELLSCHAFT, Munich (DE)

(72) Inventors: Steffen Fries, Baldham (DE); Marcus Schafheutle, Munich (DE)

(73) Assignee: SIEMENS AKTIENGESELLSCHAFT

( * ) Notice: Subject to any disclaimer, the term of this patent is extended or adjusted under 35 U.S.C. 154(b) by 265 days.

(21) Appl. No.: 16/181,825

(22) Filed: Nov. 6, 2018

(65) Prior Publication Data
US 2019/0074977 A1  Mar. 7, 2019

Related U.S. Application Data

(62) Division of application No. 15/219,786, filed on Jul. 26, 2016, now Pat. No. 10,243,745.

(30) Foreign Application Priority Data

Jul. 28, 2015 (DE) .................. 10 2015 214267.1

(51) Int. Cl.
*H04L 9/32* (2006.01)
*H04L 29/06* (2006.01)
(Continued)

(52) U.S. Cl.
CPC .............. *H04L 9/3247* (2013.01); *H04L 9/30* (2013.01); *H04L 9/3263* (2013.01);
(Continued)

(58) Field of Classification Search
CPC ....... H04L 9/3247; H04L 9/30; H04L 9/3263; H04L 9/3268; H04L 63/0281;
(Continued)

(56) References Cited

U.S. PATENT DOCUMENTS 6,516,414 B1 * 2/2003 Zhang ................... G06F 21/445
713/168
6,711,679 B1  3/2004 Guski et al.
(Continued)

FOREIGN PATENT DOCUMENTS

DE 102006060040 A1  6/2008
DE 102011081804 A1  2/2013
(Continued)

OTHER PUBLICATIONS

Restriction Requirement dated Jun. 18, 2018 for U.S. Appl. No. 15/219,786.
(Continued)

*Primary Examiner* — Shahriar Zarrineh
(74) *Attorney, Agent, or Firm* — Schmeiser, Olsen & Watts LLP

(57) ABSTRACT

A method, system, backend, terminal, and computer program product are disclosed for producing a secure communication channel for a terminal, the method having the following method steps. A first method step for setting up a secure communication channel between a communication partner and a backend by a communication protocol. A second method step for producing a communication channel between the communication partner and the terminal. A third method step for transmitting the channel binding information. A fourth method step for storing the channel binding information on the terminal. A fifth method step for creating a data structure and a first digital signature across the data structure y. A sixth method step for sending the data structure and the digital signature from the backend to the terminal. A seventh method step for checking authenticity of the data structure.

20 Claims, 2 Drawing Sheets

Figure 1:
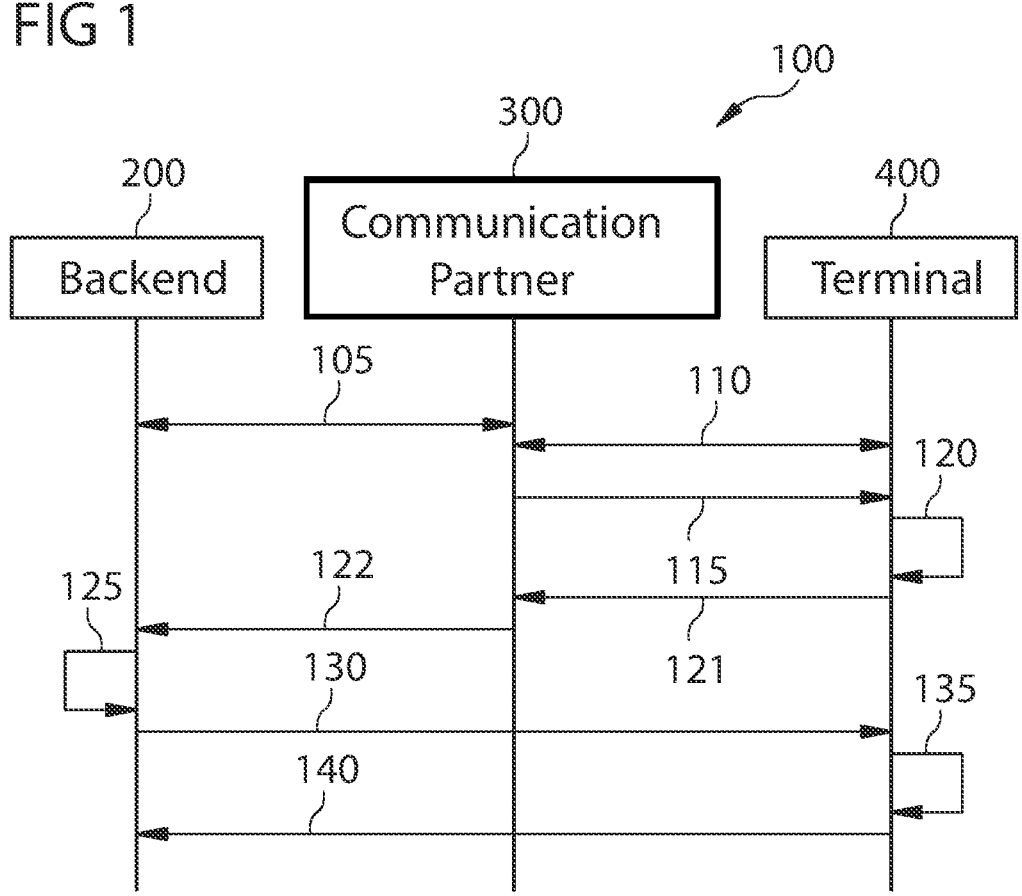

(51) Int. Cl.
*H04L 9/30* (2006.01)
*H04W 12/06* (2021.01)

(52) U.S. Cl.
CPC ........ *H04L 9/3268* (2013.01); *H04L 63/0281* (2013.01); *H04L 63/08* (2013.01); *H04L 63/123* (2013.01); *H04W 12/06* (2013.01); *H04L 63/0428* (2013.01); *H04L 63/0823* (2013.01); *H04L 63/0884* (2013.01)

(58) Field of Classification Search
CPC ... H04L 63/08; H04L 63/123; H04L 63/0428; H04L 63/0823; H04L 63/0884; H04W 12/06
USPC .......................................................... 713/176
See application file for complete search history.

(56) References Cited

U.S. PATENT DOCUMENTS

| | | | |
|---|---|---|---|
| 7,574,737 B1* | 8/2009 | Loh | H04L 63/0272 380/270 |
| 7,937,592 B2* | 5/2011 | Li | H04L 63/0428 713/189 |
| 8,031,650 B2 | 10/2011 | Petite et al. | |
| 8,316,237 B1* | 11/2012 | Felsher | H04L 9/0825 713/171 |
| 8,474,004 B2 | 6/2013 | Leone | |
| 8,654,974 B2 | 2/2014 | Anderson et al. | |
| 8,996,864 B2 | 3/2015 | Maigne et al. | |
| 10,291,651 B1* | 5/2019 | Chaubey | H04L 63/20 |
| 10,567,434 B1* | 2/2020 | Sharifi Mehr | H04L 63/0435 |
| 2005/0132229 A1* | 6/2005 | Zhang | H04L 9/3265 726/4 |
| 2005/0195775 A1 | 9/2005 | Petite et al. | |
| 2005/0210251 A1* | 9/2005 | Nyberg | H04W 12/069 713/169 |
| 2006/0117181 A1* | 6/2006 | Brickell | H04L 9/3271 713/176 |
| 2008/0235381 A1* | 9/2008 | Tanizawa | H04L 63/166 709/227 |
| 2009/0103722 A1 | 4/2009 | Anderson et al. | |
| 2010/0211792 A1* | 8/2010 | Ureche | H04L 63/102 713/176 |
| 2012/0008784 A1 | 1/2012 | Hallam-Baker | |
| 2012/0066501 A1* | 3/2012 | Xiong | H04L 9/3271 713/171 |
| 2013/0232554 A1* | 9/2013 | Campagna | H04L 9/0847 726/4 |
| 2013/0333008 A1* | 12/2013 | Tapling | H04L 9/3247 726/7 |
| 2014/0075198 A1 | 3/2014 | Peirce et al. | |
| 2014/0208404 A1 | 7/2014 | Brouwer et al. | |
| 2015/0007265 A1* | 1/2015 | Aissi | G06F 21/60 726/3 |
| 2015/0052352 A1* | 2/2015 | Dolev | H04W 12/003 713/156 |
| 2015/0071435 A1 | 3/2015 | Bhattachar et al. | |
| 2015/0113264 A1 | 4/2015 | Wang et al. | |
| 2015/0304736 A1* | 10/2015 | Lal | G06F 21/72 380/210 |
| 2016/0063496 A1 | 3/2016 | Royyuru et al. | |
| 2016/0205139 A1* | 7/2016 | Davies | H04L 63/20 726/1 |
| 2016/0255055 A1 | 9/2016 | Sanz et al. | |
| 2016/0315923 A1 | 10/2016 | Riscombe-Burton et al. | |
| 2017/0019256 A1 | 1/2017 | Rhelimi | |
| 2020/0145409 A1* | 5/2020 | Pochuev | H04L 63/061 |

FOREIGN PATENT DOCUMENTS

| | | |
|---|---|---|
| EP | 2656580 A1 | 10/2013 |
| EP | 3125492 A1 | 2/2017 |
| WO | 03088571 A1 | 10/2003 |
| WO | WO 03088571 A1 | 10/2003 |
| WO | 2006079579 A1 | 8/2006 |
| WO | WO2006079579 A1 | 8/2006 |
| WO | 2008077628 A2 | 7/2008 |
| WO | WO 2008077628 A2 | 7/2008 |
| WO | 2016078711 A1 | 5/2016 |
| WO | WO 2016078711 A1 | 5/2016 |

OTHER PUBLICATIONS

Microsoft: "Extended Protection for Authentification" Aug. 12, 2009, [gefundenOct. 17, 2018] Fundstelle:[https://blogs.technet.microsoft.com/srd/2009/12/08/extended-protection-for-authentication/.

Altman; Jeff et al.: "Channel Bindings for TLS" Jul. 30, 2010, [gefundenOct. 17, 2018] Internet Engineering Task Force (IETF); Fundstelle:[https://tools.ietf.org/html/rfc5929]; 2010.

Erweiterer Europäischer Recherchenbericht; May 12, 2016; 2016.

Microsoft: "Extended Protection for Authentication"; Aug. 12, 2009; [gefundene.Oct. 2018] Fundstelle: https://blogs.technet.microsoft.com/srd/2009/12/08/extended-protection-for-authentication/ ]; 2009.

Williams; Nicolas: "On the Use of Channel Bindings to Secure Channels" Nov. 11, 2007, [gefundenDec. 10, 2018]; Network Working Group; SUN; Nov. 2007; Request for comments: 5056; Fundstelle:[https://tools.ietf.org/html/rfc5056]; 2007.

EP Opposition dated Oct. 29, 2018 for Application No. 16180092.5.

Notice of Opposition dated Oct. 24, 2018 for Patent No. EP3125492 (Application No. 16180092.5).

Notice of Allowance (dated Nov. 7, 2018) for U.S. Appl. No. 15/219,786, filed Jul. 26, 2016.

Chinese Notice of Allowance for Application No. 201610836482.3, dated Apr. 20, 2020.

Chinese Office Action for Application No. 201610836482.3, dated Feb. 27, 2019.

Chinese Office Action for Application No. 201610836482.3, dated Oct. 30, 2019.

* cited by examiner

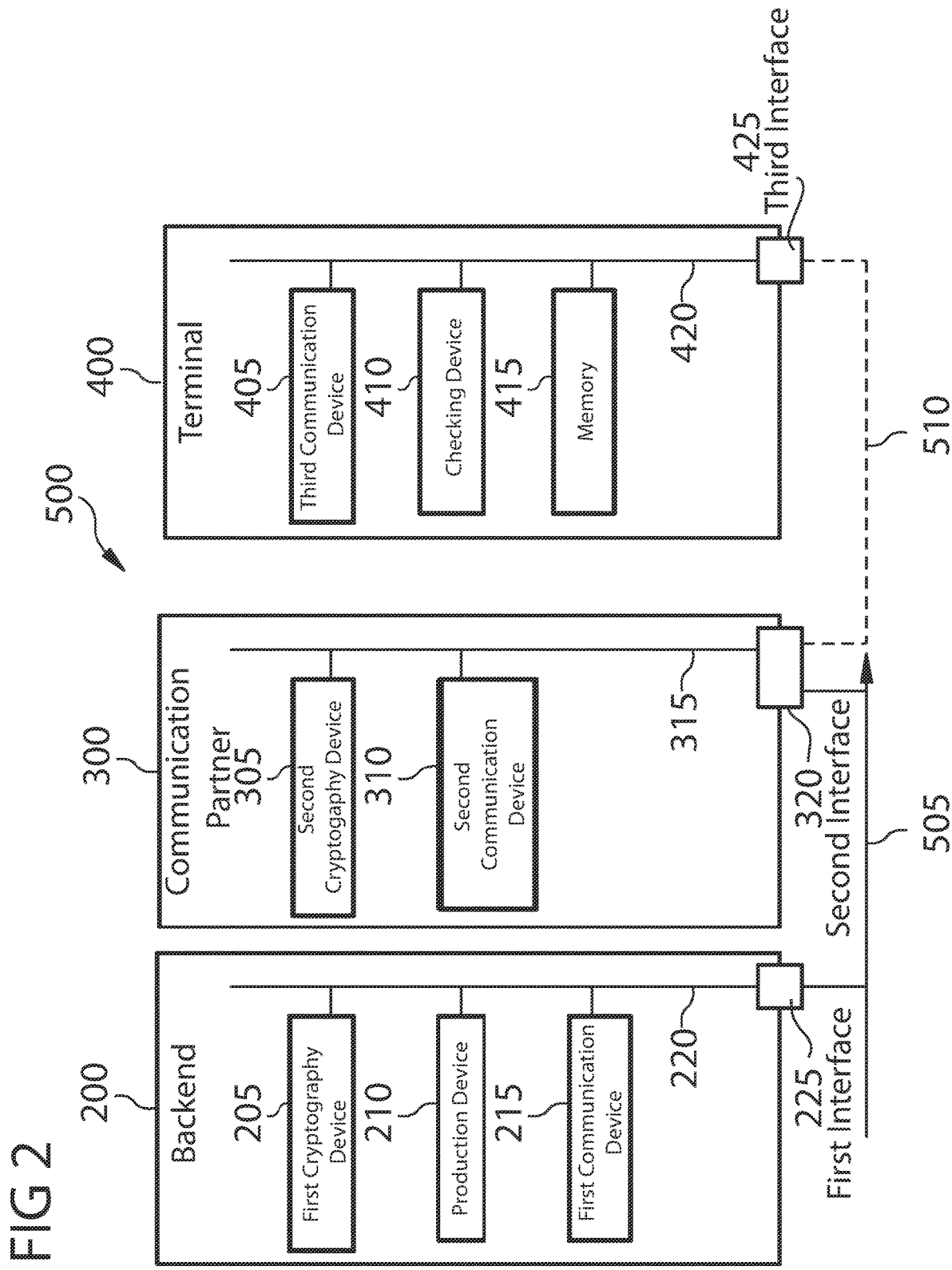

METHOD AND SYSTEM FOR PRODUCING A SECURE COMMUNICATION CHANNEL FOR TERMINALS

CROSS-REFERENCE TO RELATED APPLICATIONS

This application is a divisional application of U.S. application Ser. No. 15/219,786, filed Jul. 26, 2016, and entitled "METHOD AND SYSTEM FOR PRODUCING A SECURE COMMUNICATION CHANNEL FOR TERMINALS," which claims priority to German Application No. 102015214267.1 having a filing date of Jul. 28, 2015 the entire contents both of which are hereby incorporated by reference.

FIELD OF TECHNOLOGY

The following relates to a method and a system for producing a secure communication channel for terminals.

BACKGROUND

Security credentials such as, in particular, digital certificates, a security token or a security ticket are needed to support security services in particular scenarios. Such security services may be, for example, the establishment of a communication channel between two partners or else the transport of a license ticket between two or three participating parties. A security infrastructure usually provides such security credentials.

In a specific application which comprises the communication between three parties, there is a need to ensure that security credentials have firstly been transported in a cryptographically correct manner, but also via a secured communication channel.

SUMMARY

An aspect relates to a secure communication channel in order to transport security credentials.

According to a first aspect, the following relates to a method for producing a secure communication channel for a terminal. The method comprises a method step for setting up a secure communication channel between a communication partner and a backend by means of a communication protocol, an item of channel binding information respectively being stipulated for the backend and for the communication partner by the communication protocol. The method comprises a method step for producing a communication channel between the communication partner and the terminal. The method comprises a method step for transmitting the channel binding information to the terminal by means of the communication partner via the secure communication channel. The method comprises a method step for storing the channel binding information on the terminal. The method comprises a method step for creating a data structure and a first digital signature across the data structure by means of the backend using a first private key, the first digital signature being able to be checked using a first public key. The method comprises a method step for sending the data structure and the first digital signature from the backend to the terminal. The method comprises a method step for checking authenticity of the data structure using a checking algorithm for verifying the first digital signature using the first public key by means of the terminal and/or by means of the communication partner.

In connection with embodiments of the invention, a "backend" can be understood as meaning, for example, a data processing unit of any type, in particular data processing units with client functionalities and/or server functionalities. In contrast to a front-end, a backend is, for example, part of a computer system (for example implemented as a client/server architecture) which is remote from subscribers, in particular. In particular, in terms of viewing, it is closer to the system, whereas the front-end is closer to the user. In a client/server architecture, for example, the backend forms the server which supplies the clients.

In connection with embodiments of the invention, a "communication channel" can be understood as meaning, for example, a communication channel in the form of a wireless communication connection and/or a wired communication connection and/or communication via an optical waveguide and/or analog communication (for example letters).

In connection with embodiments of the invention, a "communication partner" can be understood as meaning, for example, a workstation having the programming tool and/or a computer belonging to an acoustician and/or a configuration device for the terminal.

The method allows a secure communication channel to be set up to the backend for the terminal and allows the data structure to be interchanged. In particular, the method provides the advantage of setting up a secure communication channel for terminals which themselves have low computing capacities and can set up only cryptographically unprotected communication channels. The communication partner therefore serves the terminal as a secure bridge to the backend. In this case, the channel binding information may be identical for the backend and for the communication partner. However, it is also possible for the channel binding information to be different for the backend and for the communication partner but to have a clear relationship via a mathematical function.

In a first embodiment of the method, the method has an additional method step for sending security information and/or identity information from the terminal to the backend via the communication partner, the sending of the security information and/or identity information from the terminal to the backend via the communication partner having, in particular, the following method steps: a method step for sending the security information and identity information from the terminal to the communication partner and a method step for sending the security information and identity information relating to the terminal from the communication partner to the backend via the secure communication channel.

This makes it possible to send security-critical information relating to the terminal to the backend via the secure communication channel of the communication partner.

In further embodiments of the method, the data structure comprises the channel binding information and/or basic information from the backend.

The advantage lies in the inclusion of a unique identification in the form of the channel binding information for the secure communication channel between the backend and the communication partner. Since the secure communication channel between the backend and the communication partner was established according to a predefined security guideline of the backend and is bound to the communication with the terminal by means of the channel binding information, there is a direct security relationship between the backend and the terminal. This makes it possible to ensure, on the terminal side and also on the backend side, that an item of configuration information, for example a license ticket, has been transported via a previously established communication channel which was established according to a security guideline of the backend.

In further embodiments of the method, a signal is provided by the terminal and/or by the communication partner if the checking algorithm determines invalid authenticity.

The signal which may contain an item of control information can be used, for example, to inform a user if invalid authenticity has been determined. In such a case, the user can terminate the connection, for example, in order to prevent security-critical information from being transmitted. However, it is also possible for the signal to be used to deliberately suppress error messages or else to deliberately keep them general.

In further embodiments of the method, the first public key is provided for the terminal, a certification authority or the backend, in particular, providing the first public key.

As a result, the first public key is made available to the terminal in a manner which is as simple as possible.

In further embodiments of the method, the basic information from the backend comprises an item of configuration information, the configuration information comprising, in particular, an item of licensing information and/or program code for executing a command which is executed by the terminal on the terminal.

This makes it possible, for example, to transmit an item of licensing information, for example a license ticket, to the terminal in a manner which is protected as far as possible in order to enable new device functions on the terminal, for example.

In further embodiments of the method, the terminal has a second key pair in the form of a second public key and a second private key, which key pair is used to generate a second digital signature for the security information from the terminal.

This makes it possible to cryptographically protect the security information. The second key pair or the cryptographic method used is independent here of the first private key and of the first public key which form a first key pair. Key strengths and cryptographic methods of different strengths can therefore be selected in each case. In particular, terminals having low computing capacities, for example, may use such a weak cryptographic method and a considerably stronger cryptographic method can be used between the communication partner and the backend.

In further embodiments of the method, the communication partner checks second authenticity of the security information using the second public key and the second digital signature.

This makes it possible for the communication partner to check the authenticity of the second digital signature. If the communication partner determines that the second digital signature is invalid, it can terminate the connection to the terminal and/or the backend, for example, so that no security-critical information, in particular, reaches unauthorized third parties.

In further embodiments of the method, the security information comprises a nonce and/or an identifier of a certificate of the terminal and/or only a fingerprint of the second public key.

The additional information in the security information allows the communication between the terminal and the backend to be made even more secure. For example, the nonce (number used once) is used to prevent replay attacks. The nonce can be produced, for example, using a random number generator or can be produced as part of a cryptographic communication protocol.

In further embodiments of the method, the security information and/or the channel binding information and/or the identity information is completely or partially included in the first digital signature.

Including the channel binding information in the digital signature has the advantage, in particular, that the terminal can check the existence of a secure communication channel between the backend and the communication partner. This is possible since the communication partner has transmitted its channel binding information to the terminal and the backend has likewise stored its channel binding information in the first digital signature. As a result of the fact that the first digital signature is used to cryptographically protect the channel binding information from the backend, it is ensured that manipulation can be detected. The terminal compares the channel binding information and, in the event of manipulation of the connection, for example session hijacking, would refuse the execution of an item of configuration information. The method makes it possible for a computationally weak terminal which has only weak cryptographic protection mechanisms to nevertheless be able to use the advantages of a cryptographically strongly protected communication channel.

In further embodiments of the method, the data structure and/or the first digital signature comprise(s) an item of legitimacy information which causes the terminal to switch on particular programming, in particular.

The method makes it possible for a computationally weak terminal which has only weak cryptographic protection mechanisms to nevertheless be able to use the advantages of a cryptographically strongly protected communication channel. In particular, the legitimacy information is protected by the first digital signature.

In further embodiments of the method, the data structure is expanded with the first digital signature.

This results in the handling of the data being simplified further. Specifically, the data structure is expanded by appending the first digital signature and is sent as a unit.

In further embodiments of the method, the data structure additionally comprises the security information and/or identity information from the terminal.

Including the identity information, for example, in the data structure makes it possible for a terminal, for which manipulation of a communication connection has been detected, in particular, to be changed to a secure state, for example, in order to prevent further manipulation.

In further embodiments of the method, the checking algorithm additionally checks the stored channel binding information and the channel binding information in order to determine the authenticity, the checking algorithm being executed, in particular, on the terminal and/or on the communication partner.

The advantage of including the channel binding information in the first digital signature and/or the data structure is that the terminal can check the existence of the secure communication channel between the backend and the communication partner. This is possible since the communication partner has transmitted its channel binding information to the terminal and the backend has likewise stored its channel binding information in the first digital signature. As a result of the fact that the first digital signature is used to cryptographically protect the channel binding information from the backend, it is ensured that manipulation can be detected. The terminal compares the channel binding information and, in the event of manipulation of the connection, for example session hijacking, would refuse the execution of an item of configuration information. The method therefore makes it possible for a computationally weak terminal which has only weak cryptographic protection mechanisms to nevertheless be able to use the advantages of a cryptographically strongly protected communication channel.

In further embodiments of the method, the communication partner concomitantly sends additional information during the sending of the security information and identity information from the communication partner to the backend, the additional information comprising an item of user information, in particular.

Including the user information, for example, makes it possible, in particular, for a user who wishes to program the terminal and has requested an item of basic information, a data structure and/or an item of configuration information, for example an item of licensing information, for the terminal in order to enable new functions on the terminal to be informed of potential manipulation of the communication connection to the backend.

In further embodiments of the method, the first public key is concomitantly sent during the sending of the data structure.

This makes it possible to provide the terminal with the first public key in a particularly simple manner.

In a further embodiment, the first public key is checked by the communication partner before the first public key is forwarded to the terminal, the public key being a certificate, in particular, the certificate being validated, in particular, against a known issuer, the validation of the certificate comprising a validity and/or a rejection status, in particular.

In further embodiments of the method, the first public key is made available to the terminal at an earlier time, the earlier time being, in particular, the manufacturing time of the terminal, the first public key being protected, in particular, from being changed on the terminal.

This makes it possible to store the first public key in a read-protected and/or write-protected memory of the terminal during manufacture, for example. If, for example, the first public key is stored in a read-only memory, for example ROM (read-only memory) or WORM (write once read memory), it is protected particularly well from manipulation.

In further embodiments of the method, the first private key is a secret which is known to the backend, the secret being known, in particular, exclusively to the backend.

This achieves a high level of security since only the backend is able to create a valid first digital signature.

In further embodiments of the method, the terminal has only non-security-critical information.

The method can be used, in particular, for terminals having no or meager security functions or cryptographic functions. This has the advantage, in particular, that these terminals can nevertheless use a communication channel which is strongly cryptographically protected.

In further embodiments of the method, the secure communication channel is produced by means of a symmetrical method, the symmetrical method using, in particular, authentication with a username and a password, or the secure communication channel is produced by means of an asymmetrical method, the asymmetrical method using a digital certificate, in particular.

As a result of the fact that it is possible to use different cryptographic methods, the method according to embodiments of the invention can be used for different security infrastructures, for example.

In further embodiments of the method, the signal is evaluated by the backend or a further communication partner.

Evaluating the signal makes it possible to check, for example in the further communication partner, for example a security station, which terminals were potentially exposed to a manipulation attempt and to change these terminals to a secure state, for example. This is carried out, for example, while an affected terminal is still communicating with the backend or during the next communication between an affected terminal and the backend.

In further embodiments of the method, the secure communication channel meets security requirements stipulated by the backend, the terminal checking, in particular, the first digital signature in order to determine whether the communication channel actually meets the security requirements of the backend.

The backend can hereby stipulate, for example, security parameters such as the key strength or the communication protocol and can therefore also implicitly stipulate the channel binding information. This has the advantage that the backend can stipulate the security requirements for the communication with the terminal without the terminal having to have cryptographic functions or cryptographic communication protocols.

According to another aspect, the embodiments of the invention relate to a system. The system has a backend, a communication partner and a terminal. The backend also comprises a first cryptography device, a first communication device and a first production device. The production device creates a data structure and a first digital signature across the data structure using the first cryptography device and a first private key, the first digital signature being able to be checked using a first public key. The first communication device is programmed by means of a first processor to send the data structure and the digital signature to a terminal. The first communication device is additionally programmed by means of the first processor to set up a secure communication channel to a communication partner by means of a communication protocol using the first cryptography device, an item of channel binding information respectively being stipulated by the communication protocol for the backend and for the communication partner. The communication partner comprises a second cryptography device and a second communication device. The second communication device is programmed by means of a second processor to set up the secure communication channel to the backend using the second cryptography device. The second communication device is additionally programmed by means of the second processor to set up a communication channel to the terminal. The second communication device is additionally programmed by means of the second processor to send the channel binding information to the terminal. The terminal comprises a third communication device, a checking device and a memory. The third communication device is programmed by means of a third processor to set up the communication channel to the communication partner. The third communication device is additionally programmed by means of the third processor to receive the channel binding information and/or the data structure and/or the first digital signature and/or the first public key. The checking device checks authenticity of the data structure by means of a checking algorithm using the first digital signature and the first public key. The memory stores the channel binding information and/or the data structure and/or the first digital signature and/or the first public key.

In a first embodiment of the system, the system is entirely or partially a virtualized system.

This makes it possible to favorably implement system components, in particular, without using expensive hardware.

A computer program product having program instructions for carrying out said method according to embodiments of the invention is also claimed. A provision apparatus for storing and/or providing a data structure, which provision apparatus comprises the computer program product is additionally claimed. The provision apparatus is, for example, a data storage medium which stores or provides the computer program product. Alternatively, the provision apparatus is, for example, a computer system, a server system, a network, a cloud-based computer system and/or a virtual computer system which stores and/or provides the computer program product. This provision is preferably effected as a download of the complete computer program product, but may also be effected as a partial download, for example, which consists of a plurality of parts and is downloaded, in particular, via a peer-to-peer network. Such a computer program product is read into a system using the provision apparatus in the form of the data storage medium, for example, and executes the program instructions, with the result that the method according to embodiments of the invention is executed on a computer.

BRIEF DESCRIPTION

Some of the embodiments will be described in detail, with reference to the following figures, wherein like designations denote like members, wherein:

FIG. 1 shows an illustration of an exemplary embodiment of a method for producing a secure communication channel for terminals; and FIG. 2 shows an illustration of an exemplary embodiment of a system for producing a secure communication channel for terminals.

In the figures, functionally identical elements are provided with the same reference symbols, unless indicated otherwise.

DETAILED DESCRIPTION

FIG. 1 shows an illustration of an exemplary embodiment of a method for producing a secure communication channel for terminals 400, for example hearing aids.

The quality of the performance of a hearing aid can be adjusted, for example, via a so-called performance level. That is to say, the higher the performance level, the better the performance of the hearing aid, but also the higher the price of the hearing aid. If an acoustician would like to increase the performance level of a hearing aid for a customer, for example, this function must be enabled on the hearing aid, for example by means of a license ticket from the hearing aid manufacturer. The hearing aid manufacturer will in turn then charge the acoustician for the higher performance level and the acoustician accordingly passes the higher costs on to his customer. In this case, the above-mentioned license ticket corresponds to a license to internally adjust the performance level for a hearing aid. In this case, a programming tool of a communication partner 300 firstly communicates with the terminal 400 or the hearing aid. The programming tool additionally establishes a secure communication channel to the backend of the hearing aid manufacturer, with whom the acoustician preferably holds an account for orders and invoices and must be authenticated for this purpose with a username and a password.

Specifically, in this exemplary embodiment, a desired function, for example an increase in the performance level of the hearing aid, is performed on a terminal 400, for example a hearing aid, by a communication partner 300, for example a workstation having the programming tool for the terminal 400. In other words, the communication partner 300 having the programming tool wishes to enable the desired function on the terminal 400. For this purpose, the communication partner 300, for example, must request an item of configuration information, for example a license for enabling the desired functions, for the terminal 400 from a backend 200.

In a first method step 105, a secure connection in the form of a secure or security-protected communication channel is set up between the communication partner 300 and the terminal 400. A communication protocol, for example a hybrid encryption protocol such as the transport layer security protocol (TLS), is used for this purpose. The communication protocol respectively stipulates channel binding information for a secure communication channel between the communication partner 300 and the backend 200. For the authentication, server-side authentication of the backend 200 is carried out as part of the communication protocol, on the one hand, and authentication by the programming tool on the basis of a username and a password of the user of the programming tool is carried out, on the other hand. The terminal 400 does not know this secure communication channel and preferably uses a cryptographically unprotected connection or a connection which has weaker cryptographic protection than the connection existing between the communication partner 300 and the backend 200 to communicate with the programming tool or the communication partner 300.

In this case, the channel binding information may be identical for the backend 200 and for the communication partner 300. Alternatively, different channel binding information can be used for the backend 200 and for the communication partner 300. In this case, it is necessary for a second item of channel binding information from the backend 200 to be able to be calculated from a first item of channel binding information from the communication partner 300 by means of a transformation function. However, it is also possible for the first channel binding information to be calculated from the second channel binding information using the same transformation function or another suitable transformation function. In addition, the transformation functions must be known to the terminal 400 so that the terminal can possibly check an item of received channel binding information in order to determine whether received data from the backend 200 have been requested by the terminal 400 or the communication partner 300 via the secure communication channel. This makes it possible to detect manipulation of the secure communication channel, in particular.

In order to enable the desired functions on the terminal 400 by the communication partner 300, a communication channel is set up from the communication partner 300 to the terminal 400 in a second method step 110. The programming tool can now determine the channel binding information from the communication partner 300 for the secure communication channel.

In a third method step 115, the programming tool is used to request the terminal 400 to generate a new license request. In addition to the license request, the request also contains the channel binding information from the communication partner 300. In a method step 120, the terminal 400 then stores this value until the new license ticket is received.

The terminal 400 uses a random number generator to generate security information, for example in the form of a random number, which is also referred to as a nonce (number used once), and, in a fourth method step 121, sends this security information to the programming tool together with an item of identity information, for example a unique device identifier, relating to the terminal 400. In order to enable the desired functions, the terminal 400 also sends a license request to the communication partner 300 or the programming tool. This terminal information, that is to say the license request, the security information and the identity information is transmitted together in a fifth method step 122 to the backend 200 with additional information relating to the communication partner 300, for example user information relating to the current user of the programming tool.

The backend 200 in turn checks the authorization and, in a sixth method step 125, creates a data structure, for example a license ticket, containing the new requested license value for the desired functions which are intended to be enabled. The license ticket consists, for example, of the license request, channel binding information from the backend 200 and the first digital signature across the identity information, the nonce and a new license value. For this purpose, the backend 200 has the necessary first private key for generating the signature and the terminal 400 has the associated first public key which is needed to check the first digital signature. The first public key must be protected only against modification on the terminal 400. It can also be stated that the terminal 400 has the root certificate of the first public key of the backend 200.

In a seventh method step 130, the backend 200 sends the data structure and the first digital signature to the terminal 400. These data, that is to say the first digital signature and the data structure, can be sent to the terminal 400 via a separate cryptographically unprotected channel, for example. Alternatively, however, the existing connection via the communication partner 300 can also be used for the sending operation.

Therefore, the terminal 400 not only has the possibility of using a checking algorithm in an eighth method step 135 to check that the license ticket is cryptographically correct but also has the possibility of checking whether the license ticket has been provided via the secure communication channel which meets the security requirements (security policy), for example the strength of the cryptographic methods, the authentication strength, the integrity protection and also the encryption, of the backend 200. This is stipulated by virtue of the backend 200 specifying the security requirements for the secure communication channel to the communication partner 300. Since the terminal 400 uses the checking algorithm to check for a sufficient match between the channel binding information stored on the terminal 400 and the channel binding information of the data structure or the first digital signature, the compliance with the security requirements of the backend 200 can therefore be indirectly ensured on the terminal 400. The prerequisite for this is a relationship of trust between the terminal 400 and the backend 200, which is provided by the available root certificate in the terminal 400.

In a ninth method step 140, a signal comprising an item of control information, for example, is provided by the terminal 400 and/or by the communication partner 300 if the checking algorithm determines invalid authenticity for the first digital signature or the lack of a match between the channel binding information stored on the terminal 400 and the channel binding information sent by the backend.

In one variant, instead of unilateral authentication between the backend 200 and the communication partner 300, the communication protocol carries out mutual authentication by means of a handshake method, for example a TLS handshake, on the basis of digital certificates, for example X.509 certificates, and corresponding private keys. In this case, the certificate of the communication partner 300 may ideally contain the user information. This possibly makes it possible to dispense with the authentication by means of a username and a password.

In another variant, a protocol with integrated communication protection is used for the communication between the communication partner 300 or the programming tool and the terminal 400. However, this presupposes the corresponding key material, for example a second key pair containing a second private key and a second public key, on both sides. A possible protocol is again the TLS protocol. However, the security requirements are preferably weaker here than the security requirements imposed on the secure communication channel.

In another variant, the channel binding information is formed by one of the following parameters. However, it is also possible for the channel binding information to be formed from a plurality of parameters.

An identifier for the secure communication channel or the session between the backend 200 and the communication partner 300. For example, the TLS-unique parameter can be used when using the TLS protocol.

An identifier of the transmitter of the secure communication channel.

An identifier of the receiver of the secure communication channel.

Information relating to the negotiated communication security, for example the authentication method used, the integrity protection used and/or the confidentiality level used.

A time stamp, for example the time at which the secure communication channel was produced.

A nonce which was generated by a random number generator, for example.

In another variant, the communication partner or the programming tool checks the license ticket before it is forwarded to the terminal 400. This is useful, in particular, when the terminal 400 has limited memory and/or computing capacity. In this case, possible reactions of the programming tool, for example the deletion of data, the processing of an error message, the generation of an alarm, depend on the relationship of trust between the subscribers, that is to say the backend 200, the communication partner 300 and the terminal 400.

The computer system 500 comprises a backend 200, for example in the form of a license server belonging to a hearing aid manufacturer, preferably a server having a Linux operating system. A first interface 225 of the license server is connected, for example, to a second interface 320 of a communication partner 300 in the form of a computer belonging to an acoustician, preferably an Apple iMac, via an Internet connection 505. The communication partner 300 is connected, for example by means of the second interface 320, to the third interface 425 of a terminal 400, preferably a hearing aid, via a local network connection 510, preferably a wireless network connection.

The backend 200 and the communication partner 300 each comprise, for example, commercially available hardware components such as a display device, preferably in the form of a TFT monitor, at least one input device, preferably in the form of a computer mouse and/or a keyboard, at least one data storage medium, preferably in the form of a solid-state hard disk and/or a DVD reading and/or writing drive, a processor, preferably an Intel x86-compatible processor, a network interface, preferably an Ethernet interface, a main memory, preferably DDR RAM, and/or further hardware or peripherals known to a person skilled in the art.

The backend 200 additionally comprises a first cryptography device 205, a production device 210, a first communication device 215 and the first interface 225 which are communicatively connected to one another via a first internal bus 220, for example a data bus. The production device 210 creates a data structure and a first digital signature across the data structure using the first cryptography device 205 and a first private key, the first digital signature being able to be checked using a first public key. The first communication device 215 is programmed by means of a first processor to send the data structure and the first digital signature to a terminal 400. The first communication device 215 is additionally programmed by means of the first processor to set up a secure communication channel to a communication partner 300 by means of a communication protocol using the first cryptography device 205, an item of channel binding information respectively being stipulated for the backend 200 and for the communication partner 300 by the communication protocol.

The communication partner 300 additionally comprises a second cryptography device 305, a second communication device 310 and the second interface 320 which are communicatively connected to one another via a second internal bus 315, for example a data bus. The second communication device 310 is programmed by means of a second processor to set up the secure communication channel to the backend 200 using the second cryptography device 305. The second communication device 310 is additionally programmed by means of the second processor to set up a communication channel to the terminal 400. The second communication device 310 is additionally programmed by means of the second processor to send the channel binding information to the terminal 400.

The terminal 400 comprises a third communication device 405, a checking device 410, a memory 415 and the third interface 425 which are communicatively connected to one another via a third internal bus 420, for example a data bus. The terminal 400 also has further components which are known to a person skilled in the art and are known for a hearing aid from the prior art.

The third communication device 405 is programmed by means of a third processor to set up the communication channel to the communication partner 300. The third communication device 405 is additionally programmed by means of the third processor to receive the channel binding information and/or the data structure and/or the first digital signature and/or the first public key.

The checking device 410 checks authenticity of the data structure by means of a checking algorithm using the first digital signature and the first public key.

The memory 415 stores the channel binding information and/or the data structure and/or the first digital signature and/or the first public key.

Although the invention has been described and illustrated more specifically in detail by means of the exemplary embodiments, the invention is not restricted by the disclosed examples and other variations can be derived therefrom by a person skilled in the art without departing from the scope of protection of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A method for producing a secure communication channel for a terminal, the method having the following steps of:
    setting up a secure communication channel between a communication partner and a backend by a communication protocol, an item of channel binding information respectively being stipulated for the backend and for the communication partner by the communication protocol, wherein the item of channel binding information comprises at least one of: an identifier for the secure communication channel, an identifier of a transmitter of the secure communication channel, an identifier of the receiver of the secure communication channel, negotiated communication security information, a time stamp, and a nonce;
    producing a communication channel between the communication partner and the terminal;
    transmitting the channel binding information relating to the secure communication channel to the terminal by the communication partner, wherein the channel binding information is part of a request for the terminal to generate a license request;
    storing the channel binding information on the terminal;
    sending the license request to the backend via the communication partner;
    checking the license request and, in response, creating a data structure and a first digital signature across the data structure by the backend using a first private key, the first digital signature being able to be checked using a first public key, wherein the data structure is a license ticket, and wherein the data structure comprises the channel binding information;
    sending the data structure and the first digital signature from the backend to the terminal; and
    checking authenticity of the data structure using a checking algorithm for verifying the first digital signature using the public key by the terminal and/or by the communication partner;
    sending security information and identity information relating to the terminal from the terminal to the communication partner;
    sending the security information and identity information relating to the terminal from the communication partner to the backend via the secure communication channel;
    wherein the terminal has a second key pair, in the form of a second public key and a second private key, used to generate a second digital signature for the security information from the terminal, and
    wherein the communication partner checks second authenticity of the security information using the second public key.

2. The method as claimed in claim 1, wherein the data structure further comprises basic information from the backend.

3. The method as claimed in claim 2, wherein the basic information from the backend comprises an item of configuration information, the configuration information comprising, in particular, an item of licensing information and/or program code for executing a command which is executed by the terminal on the terminal.

4. The method as claimed in claim 1, wherein a signal is provided by the terminal and/or by the communication partner if the checking algorithm determines invalid authenticity.

5. The method as claimed in claim 4, wherein the signal is evaluated by the backend or a further communication partner.

6. The method as claimed in claim 1, wherein the first public key is provided for the terminal, a certification authority or the backend, in particular, providing the first public key.

7. The method as claimed in claim 1, wherein the security information has at least one of a nonce and an identifier of a certificate of the at least one of the terminal and only a fingerprint of the second public key.

8. The method as claimed in claim 1, wherein the security information and/or the channel binding information and/or the identity information is completely or partially included in the first digital signature.

9. The method as claimed in claim 1, wherein the data structure and/or the first digital signature comprises an item of legitimacy information which causes the terminal to switch on particular programming.

10. The method as claimed in claim 1, wherein the data structure is expanded with the first digital signature.

11. The method as claimed in claim 1, wherein the data structure additionally comprises the security information and/or identity information from the terminal.

12. The method as claimed in claim 1, wherein the checking algorithm additionally checks the stored channel binding information and the channel binding information in order to determine the authenticity, wherein the checking algorithm is executed, on at least one of the terminal and the communication partner.

13. The method as claimed in claim 1, wherein the communication partner concomitantly sends additional information during the sending of the security information and identity information from the communication partner to the backend, the additional information comprising an item of user information.

14. The method as claimed in claim 1, wherein the first public key is concomitantly sent during the sending of the data structure.

15. The method as claimed in claim 1, wherein the first public key is made available to the terminal at an earlier time, the earlier time being, the manufacturing time of the terminal, the public key being protected, from being changed on the terminal.

16. The method as claimed in claim 1, wherein the first private key is a secret which is known to the backend, the secret being known, exclusively to the backend.

17. The method as claimed in claim 1, wherein the terminal has only non-security-critical information.

18. The method as claimed in claim 1, wherein the secure communication channel is produced by a symmetrical method, the symmetrical method uses authentication with a username and a password, or the secure communication channel is produced by an asymmetrical method, the asymmetrical method using a digital certificate.

19. The method as claimed in claim 1, wherein the secure communication channel meets security requirements stipulated by the backend, wherein the terminal checks the first signature in order to determine whether the communication channel actually meets the security requirements of the backend.

20. The method as claimed in claim 1, wherein the first public key is checked by the communication partner before the first public key is forwarded to the terminal, the public key being a certificate, the certificate being validated, in particular, against a known issuer, the validation of the certificate comprising a validity and/or a rejection status.

* * * * *